US006788249B1

United States Patent
Farmer et al.

(10) Patent No.: US 6,788,249 B1
(45) Date of Patent: Sep. 7, 2004

(54) SYSTEM FOR SETTING COARSE GPS TIME IN A MOBILE STATION WITHIN AN ASYNCHRONOUS WIRELESS NETWORK

(75) Inventors: Dominic Farmer, Los Gatos, CA (US); Laszlo Leirer, San Jose, CA (US)

(73) Assignee: Snaptrack Incorporated, San Diego, CA (US)

( * ) Notice: Subject to any disclaimer, the term of this patent is extended or adjusted under 35 U.S.C. 154(b) by 0 days.

(21) Appl. No.: 10/689,800

(22) Filed: Oct. 20, 2003

Related U.S. Application Data

(60) Provisional application No. 60/489,652, filed on Jul. 23, 2003.

(51) Int. Cl.[7] .............................. G01S 5/02; H04B 7/185
(52) U.S. Cl. .............................. 342/357.12; 342/357.1; 342/357.09; 701/213
(58) Field of Search ........................ 342/357.12, 357.1, 342/357.09; 701/213

(56) References Cited

U.S. PATENT DOCUMENTS 5,893,044 A * 4/1999 King et al. ................. 701/214

* cited by examiner

*Primary Examiner*—Theodore M. Blum
(74) *Attorney, Agent, or Firm*—Philip Wadsworth; Charles Brown; Donald Kordich

(57) ABSTRACT

A method and apparatus for setting coarse GPS time in a GPS receiver in a mobile station (MS) that is communicating with a base station and a position determining entity (PDE). The MS requests an assistance message from the PDE that includes a sequence of predicted navigation bits, including a predicted time indicator field, which is then located and decoded. Coarse time is set responsive to the time indicator value. A Pattern Match Algorithm may be performed to provide more precise GPS time. In order to better set coarse time, an expected error in the Time of Week may be determined, by for example using the expected network latency. The system describe herein enables the use of IS-801 protocol by an MS in asynchronous networks by improving the coarse time setting process.

17 Claims, 6 Drawing Sheets

SYSTEM FOR SETTING COARSE GPS TIME IN A MOBILE STATION WITHIN AN ASYNCHRONOUS WIRELESS NETWORK

RELATED APPLICATIONS

This application claims priority to U.S. Provisional Application No. 60/489,652, filed on Jul. 23, 2003.

FIELD OF THE INVENTION

The present invention generally relates to position location systems that determine the position of a mobile station, such as a cellular phone, by use of wireless signals.

DESCRIPTION OF RELATED ART

Existing position location techniques based on global positioning system (GPS) satellites utilize a network of satellites, commonly known as space vehicles (SV's), that transmit signals that are accurately phase referenced to GPS time. A GPS receiver on the ground measures the relative times of arrival of the signals from each "in view" SV (i.e., each SV from which the receiver can receive signals). The relative times of arrival of the signals along with the exact location of the SVs are used to determine the position of the GPS receiver using a technique commonly known as trilateration. A relatively accurate estimate of GPS time at the time the signals were transmitted from each SV is required in order to accurately determine the location of each SV at the time the signals were transmitted. For example, the SV's motion relative to earth can be as much as 950 meters/sec. The location of the SV is calculated using a mathematical equation that predicts the location of an SV in its orbit at a particular point in time. Due to the velocity of the SV, a single millisecond of time error would equate to an SV position error of up to 0.95 meters. The resulting error in the calculated position of the GPS receiver may vary. However, a general rule of thumb is that one millisecond of time error will result in an error of about 0.5 meters in the calculated position of the GPS receiver.

In order to know the exact time that the signals were transmitted from the SVs, a standard GPS receiver either demodulates the time of transmission from the received signal or maintains a clock bias estimate that estimates the difference between the local receiver clock and GPS time. Establishing the time bias between the GPS receiver's free running clock and GPS time is often referred to as "setting the clock". If the SV signal is received by the GPS receiver in good condition, then the GPS receiver can set the clock based on information contained in the received signal. The information received indicates the time of transmission. However, even in the best of conditions, setting the clock may consume considerable time (e.g. up to six seconds or more) due to the amount of time required to receive the necessary information transmitted by the SV. Furthermore, in environments in which the signal is blocked or otherwise weakened, the GPS receiver can never set the clock to GPS time, and therefore can never determine its position.

Another way to set the clock is to synchronize the clock with a reference clock that has a known relationship to GPS time. For example, synchronizing to GPS time is straightforward in a CDMA mobile station (MS) (such as a cellular phone) used in a CDMA network. This is because CDMA networks are synchronized to GPS time. Being synchronized to GPS time means that the transmissions from each of the base stations within the network are referenced to GPS time. Accordingly, the CDMA receiver in the MS has knowledge of GPS time. The operating software within the MS can simply transfer this GPS time to the GPS receiver software by, for example, relating the GPS time to a precise hardware signal or pulse which allows the GPS receiver software to associate the GPS time with its own clock time in a precise fashion. As discussed above, prior knowledge of precise GPS time inside the GPS receiver can significantly shorten the time needed to determine the location of a GPS receiver (commonly referred to as "obtaining a GPS fix"). Particularly in noisy environments, prior knowledge of precise GPS time may become important, or even essential in obtaining a GPS fix.

For quicker and more efficient determination of GPS fixes in CDMA systems, the Electronics Industry Association/Telecommunications Industry Association (EIA/TIA) adopted a standard known as the "IS-801 standard", or simply "IS-801". IS-801 includes a set of rules (commonly referred to as "protocols"). The protocols prescribe the data content and sequence of messages that can be exchanged between a position location server (commonly referred to as a PDE) and an MS. These IS-801 messages help the GPS receiver measure pseudoranges and/or generate location fixes. For example, IS-801 messages include requests for "ephemeris". Ephemeris is information regarding the orbits of the SVs. IS-801 messages also include other aiding information, such as information regarding the bit patterns that the SVs are expected to send. Predicting the bits allows the GPS receiver to perform coherent integration over longer periods of time. This in turn increases the sensitivity of the GPS receiver.

However, some cellular networks, such as the Global System for Mobile Communication (GSM) networks, are not synchronized with GPS time. Such systems are referred to as "asynchronous". Accordingly, the GPS receiver in an asynchronous network does not have direct access to GPS time from the communication signal. In the presence of noise or if the signals from the SVs are attenuated, a GPS system that does not have the luxury of attaining GPS time from the communication system may take longer to determine a GPS fix. In the extreme case, if there is too much noise, determining a GPS fix may become impossible. One method for determining GPS time in an asynchronous system is referred to as a "Pattern Match" method. In a Pattern Match method, the time at which GPS signals are received at the MS is compared with the time at which GPS signals are received at a reference receiver that is synchronized to GPS time. Assuming that the distance between the transmitting SV and the reference receiver is essentially equal to the distance between the transmitting SV and the GPS receiver, the time at which the signals are received by the reference receiver can be used to set the clock in the GPS receiver. However, since the information that is transmitted by the GPS SVs is repeated, effective operation of the Pattern Match method requires that the MS be "coarsely" synchronized with GPS time, for example to within a few seconds. Otherwise, it is impossible to tell whether the information received by the GPS receiver was transmitted at the same time as the information received by the reference receiver.

For example, assume that the same information is transmitted by a particular GPS SV every two seconds. Further assume that it is possible for the clock within the GPS receiver to be offset by as much as two seconds from the clock within the reference receiver. Now assume that both the clock within the reference receiver and the clock within the GPS receiver indicated that the information in question was received at exactly 12:00PM. Since we don't know what time the information was really received by the GPS receiver, it is possible that the information was actually received at 12:00PM, two seconds before 12:00PM, or two seconds after 12:00PM. That is, the information received by the GPS receiver might be information that was actually sent by the SV at the same time as the information received by the reference receiver, two seconds earlier, or two seconds later. Accordingly, there is no way of telling whether the clocks in the reference receiver and the MS are perfectly synchronized or out of synchronization by two seconds.

The coarse time synchronization ensures that the clock within the MS is synchronized to GPS time with sufficient accuracy to ensure that the pattern match method can determine the exact time without ambiguity. Several methods are known for establishing coarse time synchronization. In one method, a transmit and acknowledge pair of messages are used. For example, the MS transmits a request for time and simultaneously starts a local timer. The BTS receives the request from the MS and acknowledges receipt of the request by sending the current time. The MS receives the time estimate from the BTS. The MS then stops the local timer and reads the elapsed time. Such systems can assist in establishing coarse synchronization, but add cost, can become complicated, and can introduce undesirable time delays. Accordingly, there is a need for a faster and more efficient system for setting coarse GPS time in a GPS receiver.

SUMMARY OF THE INVENTION

The method and system described herein enables the use of IS-801 protocol intended for use only in synchronous networks to be used by a mobile station (MS) in an asynchronous network by improving the process used to set coarse time. One implementation of the disclosed method and system allows a "Pattern Match" algorithm to more precisely set the receiver's clock to precise GPS time.

A method is described herein for setting coarse GPS time in a GPS receiver of a mobile station (MS) that is communicating with a position determining entity (PDE) through a base station. The GPS receiver is configured to periodically receive transmitted navigation bits from a plurality of SVs synchronized with GPS time. The navigation bits include at least one time indicator field. The MS requests a sensitivity assistance (SA) message from the PDE. The message includes a sequence of predicted navigation bits. In responsive to the request from the MS, the SA message is sent from the base station approximately in time with GPS time. The SA message is received in the MS and the time of receipt is saved. A predicted time indicator field is located within the predicted navigation bits. In response to the located time indicator field, a predicted "Time of Week" (TOW) is determined. Responsive to the predicted TOW, coarse GPS time is set within the GPS receiver to reflect that the predicted navigation bits were received at the time indicated by the predicted TOW. Using the coarse time, the GPS receiver can fix the location of the GPS receiver more quickly and efficiently. For example, responsive to the coarse GPS time and the predicted navigation bits, a Pattern Match Algorithm may be performed to provide precise GPS time.

In order to better set coarse time, an expected error in the TOW may be determined by using the expected network latency. Then, the step of setting coarse GPS time within the GPS receiver may include adjusting the time to take into account the expected error due to the network latency.

The method disclosed herein enables use of the conventional IS-801 messages to assist in fixing the location of a GPS receiver in asynchronous networks such as GSM or UMTS (Universal Mobile Telephone Service). In a described embodiment, the transmitted navigation bits have a format that includes a plurality of frames. Each frame is organized into a plurality of subframes. Each subframe has a "time indicator" field, such as a "Time of Week" field. The SA message in the IS-801 standard includes at least one subframe of predicted navigation bits. In such embodiments, the method may further comprise locating a "predicted time indicator" field within a subframe of the predicted navigation bits, and calculating the TOW in response to the predicted time indicator.

In some embodiments, the SA message includes a "data length" field that specifies the length of the predicted navigation bits, and a "Reference Bit Number". The Reference Bit Number locates an "Actual Reference Bit" within a frame of the actual navigation bits with respect to the first bit of the frame that includes the Actual Reference Bit.

The particular bit selected as the Actual Reference Bit is selected because it corresponds to a Predicted Reference Bit that is at a known location within the stream of predicted navigation bits. The location of the Predicted Reference Bit is know with respect to the beginning of the stream of predicted navigation bits. By locating the Actual Reference Bit with respect to the beginning of the frame and the Predicted Reference Bit with respect to the beginning of the stream of predicted navigation bits, each of the fields within the entire stream of predicted navigation bits can be identified and located.

Once located, the time indicator field within the predicted navigation bits is decoded to provide a "predicted time indicator". Responsive to the predicted time indicator, a TOW at which the Predicted first bit of the sequence of predicted navigation bits is estimated to have been received is determined. Accordingly, coarse GPS time is set at the time the Predicted first bit of the sequence of predicted navigation bits was received within the GPS receiver based upon the TOW at which the Predicted first bit of the sequence of predicted navigation bits is estimated to have been received. The predicted time indicator is defined with regard to a weekly time reference. The step of determining the TOW may comprise computing a "Bit of Week" corresponding to the number of bits elapsed from the weekly time reference until the first bit of the sequence of predicted navigation bits. The step of computing the Bit of Week may include determining if the Predicted first bit of the sequence of predicted navigation bits is in the same subframe as the predicted time indicator, and responsive thereto, adjusting the predicted time indicator.

Additionally, methods are disclosed to adjust computation of the TOW to take into consideration boundary conditions such as week rollover (where the subframe in which the TOW is positioned immediately precedes the transition at the end/beginning of a week), and the case where the first bit of the sequence of predicted navigation bits and the TOW field lie in different, adjacent frames.

The method can be implemented in an MS for determining position utilizing periodically transmitted navigation bits from a plurality of SVs synchronized with GPS time. The periodically transmitted navigation bits include a time indicator field. The MS also communicates with one or more base stations and a position determining entity (PDE).

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION

Figure 1:
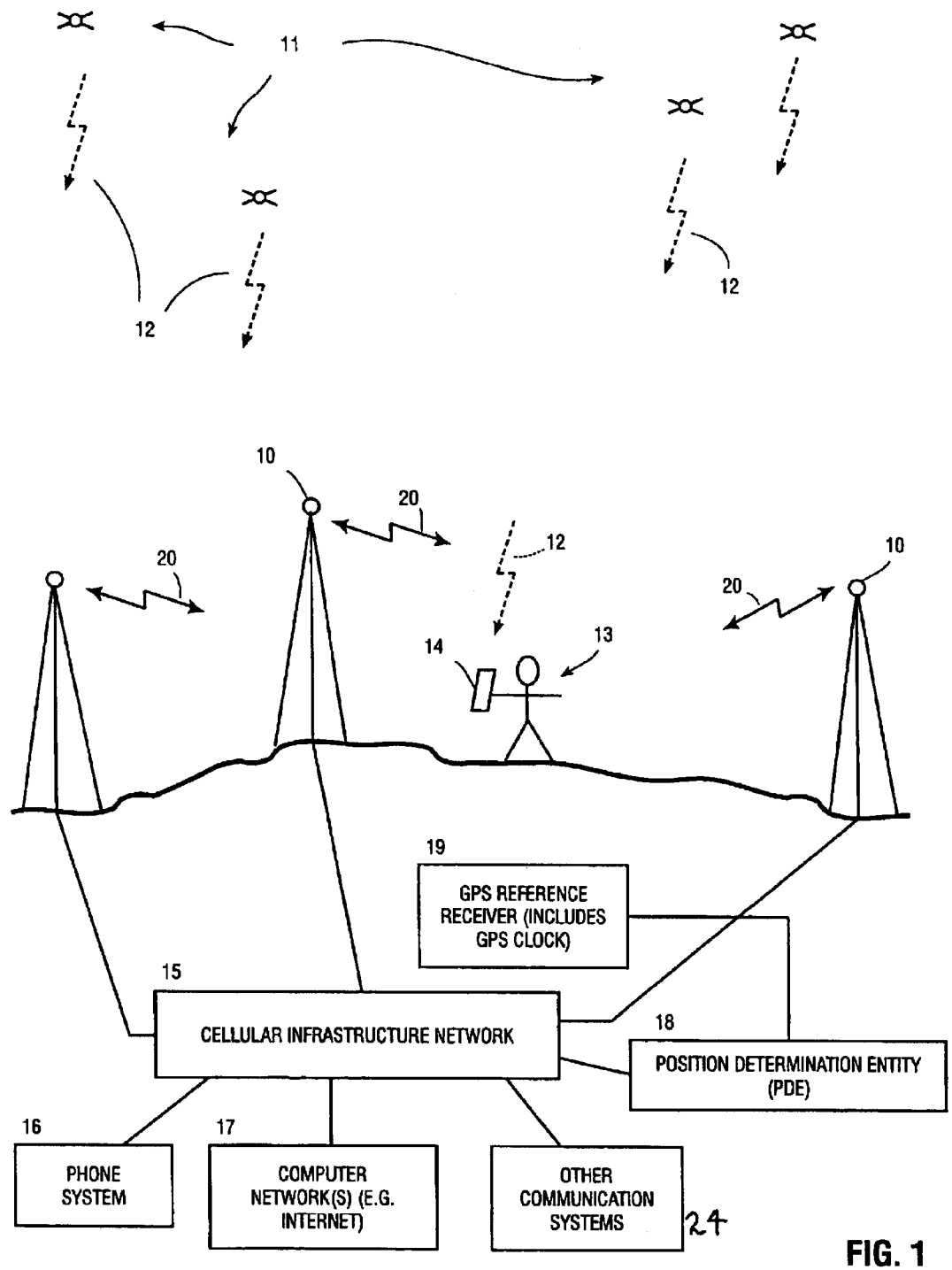
FIG. 1 shows a plurality of cellular base stations, GPS SVs, and a user holding a mobile device such as a cell phone.

In the following description, reference is made to the Figures, in which like numbers represent the same or similar elements.

Glossary of Terms and Acronyms

The following terms and acronyms are used throughout the detailed description:

GPS: Global Positioning System. Although the term GPS is often used to refer to the U.S. Global Positioning System, the meaning of this term includes other global positioning systems, such as the Russian Glonass System and the planned European Galileo System.

CDMA: Code Division Multiple Access. CDMA is a high-capacity digital wireless technology that was pioneered and commercially developed by QUALCOMM™ Incorporated. CDMA is a major commercial rival to the GSM standard.

GSM: Global System for Mobile Communications. GSM is a widely used alternative digital wireless technology.

UMTS: Universal Mobile Telephone Service. UMTS is a next generation high capacity digital wireless technology.

MS: Mobile Station. MS is any mobile wireless communication device, such as a cell phone that has a baseband modem for communicating with one or more base stations. MS's referenced in this disclosure include a GPS receiver to provide position determination capabilities.

BS: Base Station. A BS is an entity that communicates with a mobile station, for example a BS may include a BTS, a Mobile Switching Center (MSC), Mobile Positioning Center (MPC), a PDE, and any Interworking Function (IWF) useful for network connections.

BTS: Base Transceiver Station. A BTS is fixed station used for communicating with mobile stations. Includes antennas for transmitting and receiving wireless communication signals.

SV: Space Vehicle. A set of SVs compose one major element of the Global Positioning System. The SVs orbit the Earth and broadcast uniquely identifiable signals among other information.

Pseudorange measurement: A pseudorange measurement is a measurement made for the purpose of determining the relative distance between a transmitter and receiver. A process employed by GPS receivers and based on signal processing techniques to determine the distance estimate between the receiver and a selected SV. The distance is measured in terms of signal transmission time from the SV to the receiver. "Pseudo" refers to the fact that the clock of the SV and the receiver are not synchronized. Therefore, the measurement contains an uncompensated clock error term.

PDE: Position Determination Entity. A PDE is a system resource (e.g. a server) typically within the CDMA network, working in conjunction with one or more GPS reference receivers, which is capable of exchanging GPS related information with an MS. In an MS-Assisted A-GPS session, the PDE sends GPS assistance data to the MS to enhance the signal acquisition process. The MS returns pseudorange measurements back to the PDE, which is then capable of computing the position of the MS. Alternatively, in an MS-Based A-GPS session, the MS sends back computed position results to the PDE.

GPS SA message: Global Position Sensitivity Assistance Message. The GPS SA message is defined in the IS-801 protocol. The GPS SA message includes predicted navigation bits of the currently visible SVs. The navigation bits are predicted by the PDE and sent from the PDE to the MS in OTA ("over-the-air") format.

IS-95: IS-95 refers to the industry standard document published by the Telecommunications Industry Association/ Electronics Industry Association, TIA/EIA-95-B, entitled "Mobile Station—Base Station Compatibility Standard for Wideband Spread Spectrum Systems".

IS-801: IS-801 refers to the industry standard document published by the Telecommunications Industry Association/ Electronics Industry Association, TIA/EIA/IS-801, entitled "Position Determination Service Standard for Dual-Mode Spread Spectrum Systems—an adjunct standard to IS-95 and IS-2000-5 that describes the protocol between an MS and a PDE.

GPS fix: A GPS fix is the end result of a process of measurements and subsequent computations by which the location of the GPS user is determined.

IS-801 session: An IS-801 session is the sequence of data exchange between an MS and a PDE in a manner prescribed by the IS-801 standard for the purpose of getting a position fix. The sequence typically contains various GPS assistance data messages sent by the PDE and pseudorange or position result sent by the MS. Session beginning is marked by the time when either side initiates a data exchange sequence by a request and the session ends when the initiating side terminates the exchange sequence with a session-ending message.

Mobile-Terminated (MT) session: An MT session is an IS-801 session initiated by the PDE.

Mobile-Originated (MO) session: An MO session is an IS-801 session initiated by the MS.

OTA ("over-the air") format: OTA format is the format in which a message is physically transmitted.

Overview

The system described herein provides a method for "coarsely setting local time" in a mobile station (MS). The system includes receiving a "Timing Assist" message that includes the same information (and formatting) as a portion of a navigation message that is concurrently being transmitted by another source, such as a GPS satellite. Included within the Timing Assist message is a Reference Bit. The time of arrival of the Reference Bit is noted by the local clock within the MS. Assuming that the Timing Assist message was transmitted at a time properly calculated to cause the Timing Assist message to arrive at the MS at the same time as the navigation message transmitted from the GPS SV, the relative time at which the Reference Bit was received can be calculated from information (e.g., a predicted time indicator field) contained within the Timing Assist message, as will be explained in more detail below.

On advantage of the presently disclosed method and apparatus is that it extends the use of the IS-801 protocol, originally designed for synchronous networks, to asynchronous networks in order to assist in determining the location of a mobile station (MS). In general, by first utilizing a method described herein to set the coarse time, a Pattern Match algorithm can be used to improve on the coarse time and set the receiver's clock to precise GPS time. The method of setting coarse time described herein is useful because without the presently described method, the IS-801 messages exchanged between the MS and the server in synchronous systems are generally not useable in a system that utilizes an asynchronous network. Particularly, in the IS-801 standard, there is no dedicated message defined for the purpose of time transfer. This disclosure describes a method for inferring an estimate of time from IS-801 messages.

FIG. 1 illustrates one environment in which the coarse time setting system described herein can be implemented. In one described environment, a GPS receiver and cell phone are implemented together in a mobile station (MS) 14. However, it should be apparent that the present invention could be used with any other type of mobile station (other than cell phones) that communicate with one or more land-based stations. Furthermore, the MS and GPS receiver need not be integrated together, but may instead be electrically coupled either by direct connection or wireless communication.

FIG. 1 shows a plurality of cellular base stations collectively referred to by reference numeral 10, GPS satellites, commonly referred to as space vehicles (SVs), collectively referred to by reference numeral 11, and a user 13 grasping an MS 14. As described in more detail with reference to FIG. 2, the MS 14 includes a position location system 27, such as a GPS system, and a communication system 22, such as a cell phone, that utilizes two-way communication signals 20 to communicate with the cellular base stations 10. The user 13 may be on foot as shown, or may be traveling in a car or on public transportation, for example. For ease of description, the position location system 27 is referred to herein as a "GPS" system; however, it should be recognized that the system described herein could be implemented in any one of several other types of positioning systems.

The SV's 11 comprise any group of SVs utilized for positioning a GPS receiver. The SVs are synchronized to send out wireless signals 12 synchronized to GPS time. These signals are generated at a predetermined frequency, and in a predetermined format described in more detail elsewhere herein. In a current GPS implementation, each SV transmits a GPS signal on the L-frequency band (at which the GPS receiver operates). As discussed in the background, when the GPS signals 12 are detected by the GPS receiver 29 in the MS 14, the GPS system 27 attempts to calculate the relative amount of time elapsed from transmission of the GPS signal 12 until reception. In other words, the GPS system 27 calculates the difference in the amount of time required for each of the GPS signals 12 to travel from their respective SVs 11 to the GPS receiver 29. The relative measurement is referred to as a pseudo range. The pseudo range is defined as: $c \cdot (T_{user} + T_{bias} - T_{sv})$, where c is the speed of the GPS signal 12, $T_{user}$ is the GPS time when the signal 12 from a given SV 11 is received, $T_{bias}$ is the difference between the time according to the user clock and the actual GPS time, and $T_{sv}$ is the GPS time when the SV 11 transmitted the signal 12. In the general case, the receiver 29 needs to resolve four unknowns: X, Y, Z (the Earth Centered Earth Fixed coordinates of the receiver antenna), and $T_{bias}$ (the offset between the Receiver's GPS time estimate and the true GPS time when the signals 12 are received). For this general case, resolving the four unknowns usually requires measurements from four different SVs 11. However, under certain circumstances, this constraint can be relaxed. For example, if an altitude estimate is available, then the number of SVs 11 required can be reduced from four to three, since the altitude measurement can be used to define the value in the Z direction, leaving only three unknowns to be resolved.

The cellular base stations 10 comprise any collection of cellular base stations utilized as part of a communication network that communicates with the MS 14 using wireless signals 20. The cellular base stations 10 are connected to a cellular infrastructure network 15 that provides communication services with a plurality of other communication networks such as a public phone system 16, computer networks 17 such as the Internet, a position determination entity (PDE) 18 (defined above), and a variety of other communication systems shown collectively in block 24. A GPS reference receiver 19, which may be in or near the base stations 10 or any other suitable location, communicates with the PDE 18 to provide useful information in determining position, such as a GPS clock.

The ground-based cellular infrastructure network 15 typically provides communication services that allow the user 13 of a cell phone to connect to another phone using the phone system 16; however the cellular base stations could also be utilized to communicate with other devices and/or for other communication purposes, such as an internet connection with a handheld personal digital assistant (PDA). In one embodiment, the cellular base stations 10 are part of a GSM communication network; however in other embodiments other types of asynchronous communication networks may be used.

Figure 2:
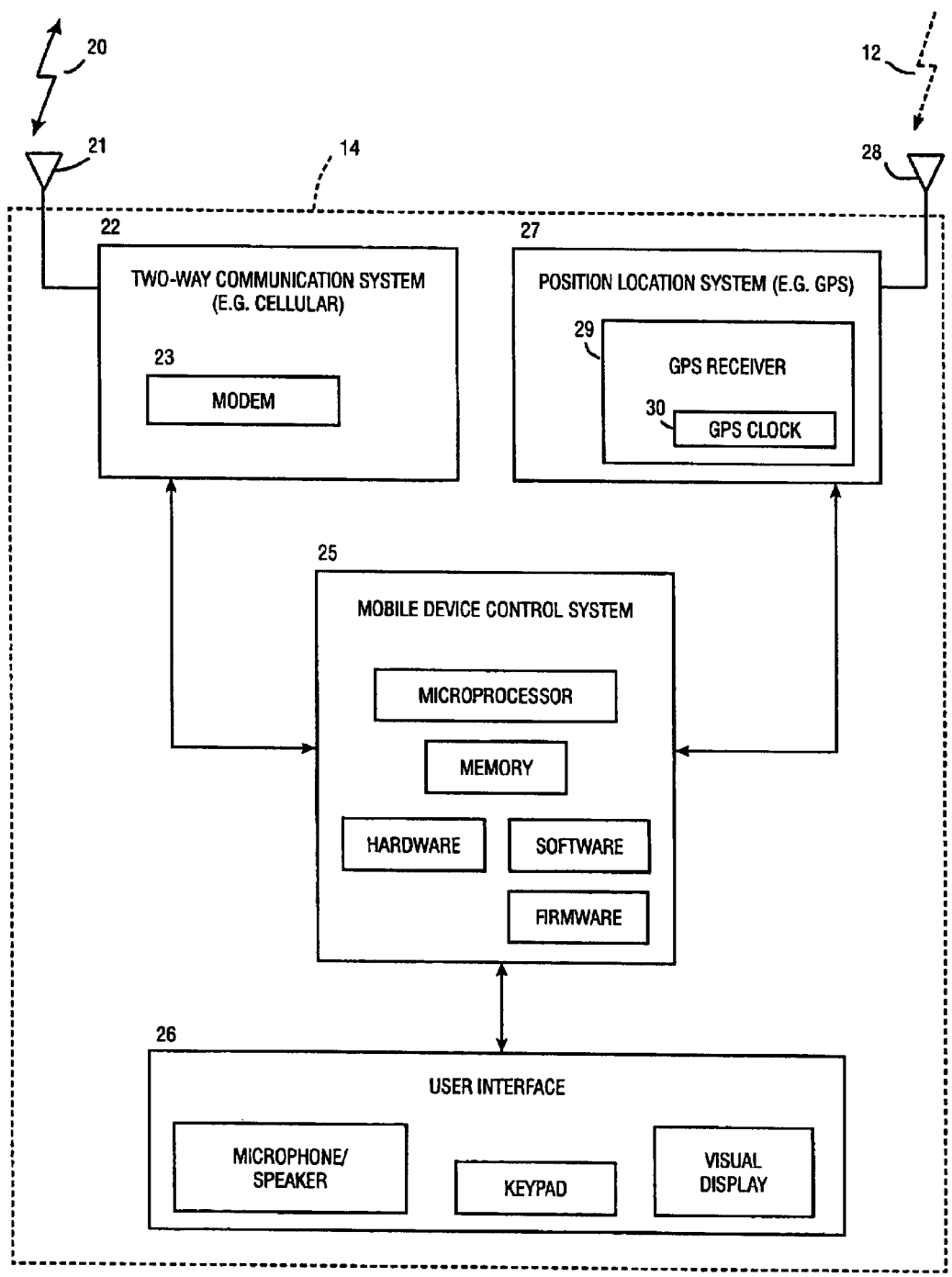
FIG. 2 is a block diagram of the mobile device in one embodiment that incorporates communication and position location systems.

FIG. 2 is a block diagram of one embodiment of the mobile device 14 incorporating communication and position location systems.

A cellular communication system 22 is shown in FIG. 2 connected to an antenna 21 that communicates using the cellular signals 20. The cellular communication system 22 comprises suitable devices, such as a modem 23, hardware, and software for communicating with and/or detecting signals 20 from cellular base stations, and processing transmitted or received information.

A position location system 27 in the MS, in this embodiment a GPS system, is connected to a GPS antenna 28 to receive GPS signals 12 that are transmitted at or near the ideal GPS frequency. The GPS system 27 comprises a GPS receiver 29, a GPS clock 30 (that may allow for clock bias and an uncertainty factor), and any suitable hardware and software for receiving and processing GPS signals and for performing any calculations necessary to determine position using any suitable position location algorithm. Some examples of GPS systems are disclosed in U.S. Pat. Nos. 5,841,396, 6,002,363, and 6,421,002, by Norman F. Krasner. The GPS clock 30 is intended to maintain accurate GPS time, however since accurate time is frequently unknown, it is common practice to maintain time in the GPS clock software by its value and an uncertainty associated with that value. It may be noted that after an accurate GPS location fix, the GPS time will be very accurately known, (to within a few nanoseconds of uncertainty in current GPS implementations).

A mobile device control system 25 is connected to both the two-way communication system 22 and the position location system 27. The mobile device control system 25 includes any appropriate structure, such as a microprocessor, memory, other hardware, firmware, and software to provide appropriate control functions for the systems to which it is connected. It should be apparent that the processing steps described herein are implemented in any suitable manner using one or more hardware, software, and/or firmware components, subject to control by the microprocessor.

The control system 25 is also connected to a user interface 26, which includes any suitable components to interface with the user, such as a keypad, a microphone/speaker for voice communication services, and a display such as a backlit LCD display. The mobile device control system 25 and user interface 26, connected to the position location system 27, provide suitable functions for the GPS receiver, and the two-way communication system, such as controlling user input and displaying results.

Figure 3:
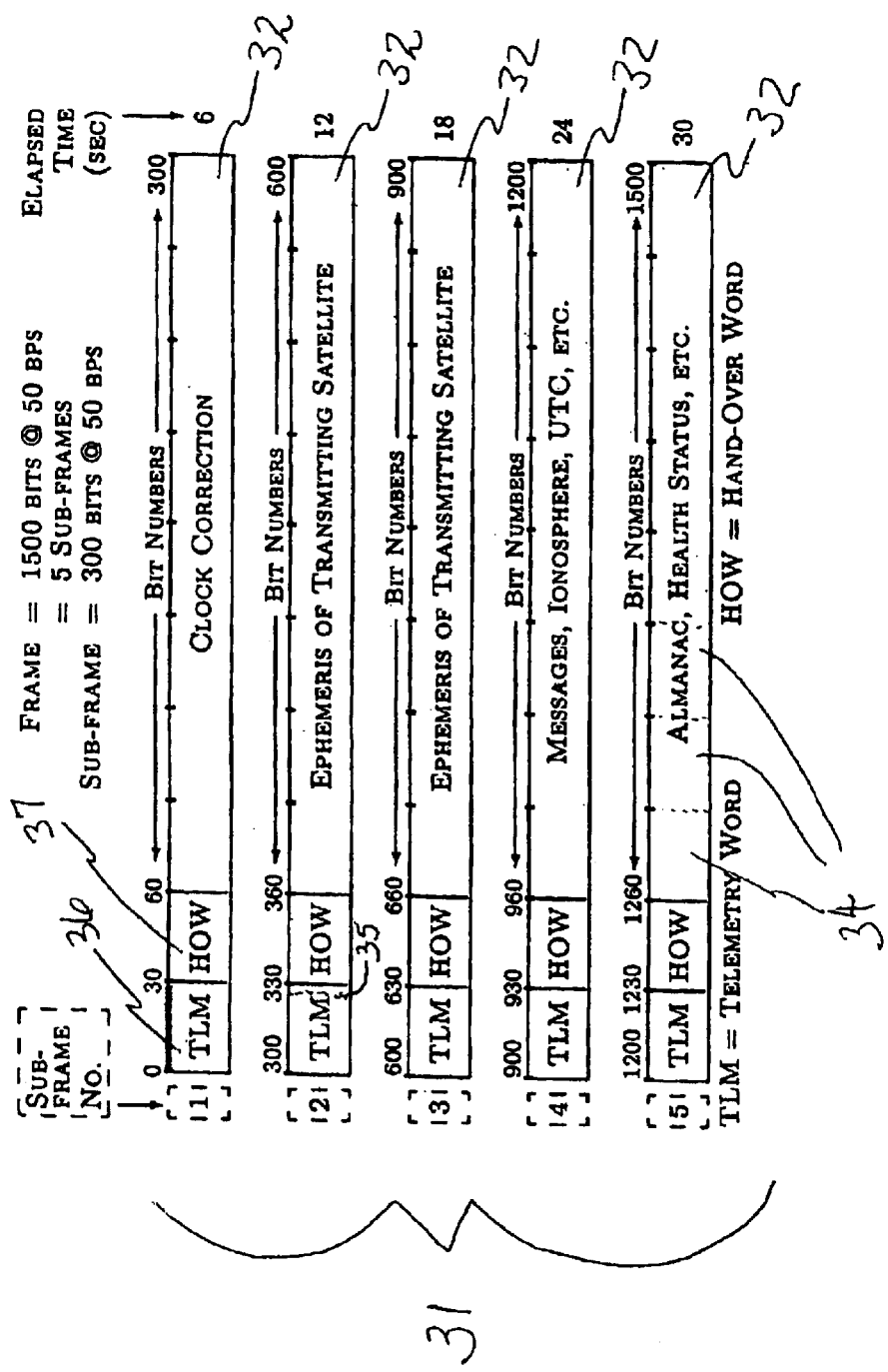
FIG. 3 is a diagram of the message structure in a GPS signal, including frames, subframes, and words.

FIG. 3 is a diagram of the standard message structure in a GPS signal 20. In one implementation, the SV transmits a sequence of frames at a rate of fifty bits per second (50 bps). The message structure includes a 1500-bit long frame 31 made up of five subframes 32. Each subframe contains ten words 34, each word 34 being thirty bits long. Of these thirty bits, six bits are designated as parity bits; the remaining 24 bits are source data bits. These 24 source data bits are the so-called "navigation" bits.

In one current GPS implementation, before transmission, each SV converts the 24 navigation bits in each word to over-the-air (OTA) format by modulo-2, adding to each of them the last computed parity bit of the previous word (the so-called D30 bit 35). Accordingly, if the D30 bit 35 is a logical "1", then each of the source data bits are inverted. If the D30 bit 35 is a logical "0", then the source data bits are left unaffected. Then, the remaining six parity bits of the word are computed using a Hamming Code. When the SV signal is received at the GPS receiver, the message is decoded from its OTA format in order to retrieve the source data bits. As discussed below in more detail, the acquisition of the SV message can take some time because it proceeds at the relatively slow pace of 50 bps. In noisy environments accurate decoding may be difficult (or impossible) to achieve. Furthermore, the time information (what is referred to herein as a "SUBFRAME COUNT" Field in the current GPS implementation) only occurs every six seconds, which means that the opportunities to decode the time sequence are fairly infrequent. In a noisy environment decoding can be problematic, and one or more opportunities to determine the time sequence may be missed, which can cause lengthy time delays before the time information can be successfully decoded.

Each 300-bit subframe 32 begins with a 30-bit "telemetry" (TLM) word 36. The TLM word 36 is followed by a 30-bit handover word (HOW) 37. The HOW includes the 17 most significant bits of a 19-bit value. That 19-bit value is sometimes referred to as the "time of week" (TOW). The 17-bit long field comprising the 17 most significant bits of the TOW is what is referred to herein as the SUB-FRAME COUNT. The SUB-FRAME COUNT is a predicted time indicator that is used in the currently disclosed method for coarse time setting. Particularly, the value in the SUB-FRAME COUNT field indicates the time at the start of the following subframe relative to the beginning of the week. Because the SUB-FRAME COUNT is reset to zero at the beginning of each week and increments every 6 seconds, the SUB-FRAME COUNT can be used as a subframe counter.

For the purposes of this document, a "subframe epoch" is the instant in time when one subframe period stops and the next one starts. The SUB-FRAME COUNT is limited to a range from 0 to 100,799. It should be noted that 100,800 times 6 seconds is equal to the number of seconds in a week. It should be clear that 100,800 is also the number of sub-frames transmitted each week. At the end of each week (i.e., when the SUB-FRAME COUNT reaches the maximum value), the SUB-FRAME COUNT is reset to zero. Accordingly, the first state of the SUB-FRAME COUNT (i.e., the SUB-FRAME COUNT value of zero) occurs at the subframe epoch which is coincident with the start of the present week. (In the current GPS implementation, this epoch occurs at midnight Saturday night—Sunday morning, where midnight is defined as 0000 hours on the Universal Time Coordinated (UTC) scale, which is nominally referenced to the Greenwich Meridian.)

It should be noted here that the SUB-FRAME COUNT is sometimes confusingly referred to as either the "Handover Word" (HOW) or "Time of Week" (TOW). However, this will not be the case in the present document.

If the GPS receiver can receive SV signals in good condition from the GPS SVs, then the receiver can demodulate the navigation bits transmitted by the visible SVs and therefore the receiver would be capable of decoding the SUB-FRAME COUNT. The SUB-FRAME COUNT can then be used to set a clock within the receiver to GPS time. However, receiving the SUB-FRAME COUNT may take up to six seconds because the SUB-FRAME COUNT occurs only once in every subframe, i.e., once every six seconds. Furthermore, in environments in which the signal is blocked or otherwise weakened, data bit demodulation is not always possible, or if possible may consume considerable time. Therefore, in order to enable rapid coarse time setting in asynchronous networks regardless of signal conditions, a system is described that utilizes a particular message (the GPS Sensitivity Assistance message) of the IS-801 protocol.

The Sensitivity Assistance (SA) message is supplied from the PDE 18 over the cellular communication signal 20. The SA message can be processed as described herein to provide a predicted HOW (rather than the actual HOW), which can then be used to set coarse time.

Figure 4:
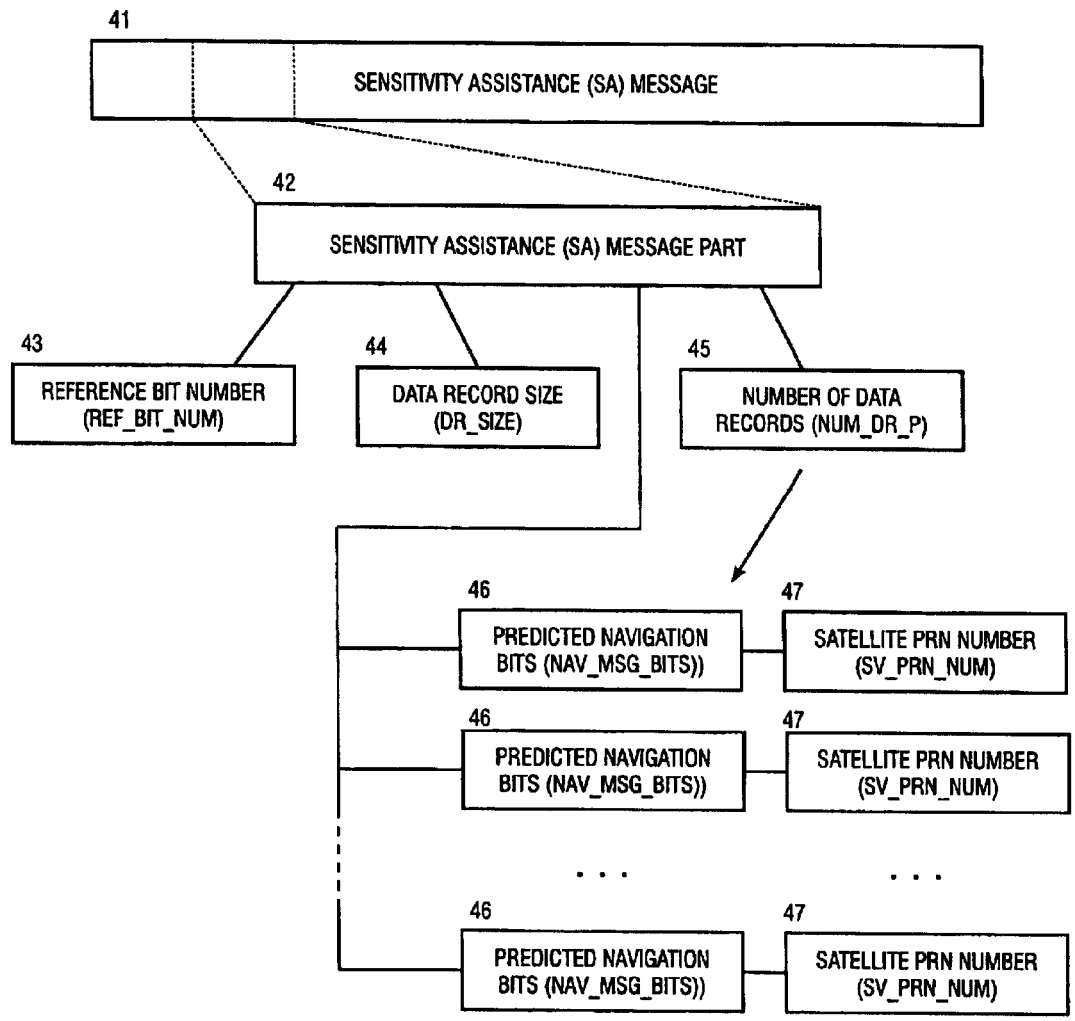
FIG. 4 is a diagram of the structure of the GPS Sensitivity Assistance (SA) message 41 as prescribed by the IS-801 protocol.

Reference is now made to FIG. 4, which is a diagram of the structure of the SA message 41 as prescribed by IS-801. The intended purpose of the SA message 41 when proposed was to provide sensitivity assistance to the MS when determining position. The SA message 41 is one type of assistance message, and it should be clear that a different format for the assistance message might be used. However, for convenience of description, the fields are referenced herein by their IS-801 names.

In the current implementation, the SA message 41 can include up to eight parts 42. Each part 42 can contain up to sixteen data records. Each record is uniquely associated with one SV. Each data record can include a Predicted Navigation Bits field 46 and a Satellite PRN Number field 47 (SV_PRN_NUM). The Predicted Navigation Bits field 46 can contain up to 510 predicted navigation bits. The Predicted Navigation Bits field 46 of the currently visible SVs is sent by the PDE 18 (FIG. 1) to the MS 14 in OTA format. Accordingly, the encoding of the predicted navigation bits follows the same algorithm as the OTA encoding used by the SVs as noted above. Because of this OTA encoding, the receiver must decode the SUB-FRAME COUNT field in the predicted navigation bits received in the SA message from the PDE 18 in order to use the SUB-FRAME COUNT information to set coarse GPS time.

In addition to the records and associated fields within the records, each part 42 of the SA message includes a number of additional fields. Some of these additional fields are illustrated in FIG. 4 with their current IS-801 designation following in parentheses. A "Reference Bit Number" field 43 (REF_BIT_NUM) conveys the position of an "Actual Reference Bit" within the 1500-bit GPS frame sent by the SVs. The Actual Reference Bit is that bit within the actual navigation bits sent from the SV that is associated with the last bit of the first half of the stream of predicted navigation bits in the SA message (hereafter referred to as the "Predicted Reference Bit"). Further information regarding the use of the Reference Bit will be provided below.

A "Data Record Size" field 44 (DR_SIZE) specifies the length of each data record that includes the predicted navigation bits. In the current implementation, the value of DR_SIZE is indicated in 2-bit increments.

A "Number of Data Records" field 45 (NUM_DR_P) specifies the number of data records in the part. In one implementation, each data record is associated with a single SV, therefore the Number of Data Records field 45 also designates the number of SVs for which information is provided in the part, up to 16.

The PDE 18 is capable of predicting the values of navigation bits emitted by the SVs at a time that is not to distant in the future based on the fact that many fields of the navigation bits are constant. Furthermore, those bits that are not constant change from their current state in a mostly predictable manner. The reference receiver 19 communicates to the PDE 18 the value of the navigation bits being transmitted by the SVs. Accordingly, the PDE 18 knows the values of the navigation bits most recently transmitted by the GPS SVs. The PDE 18 uses the values of the navigation bits received from the reference receiver 19 to predict the values of the navigation bits that will be transmitted in the future. Particularly, the predicted navigation bits are predicted by the PDE 18 based upon the knowledge that the values of the navigation bits repeat or knowledge that the values they represent will increment periodically by a known amount at a known rate over time.

In one example, in a synchronous CDMA network, the PDE 18 sends an SA message to the MS with 496 predicted navigation bits for each visible SV, which is equivalent to 9.92 seconds worth of navigation bits. In synchronous networks the predicted navigation bits in the SA message are used to increase the GPS receiver's sensitivity. However, as described herein, in asynchronous networks the SA message is used for a completely different purpose. That is, the SA message is used in an asynchronous network to set coarse time. As long as the PDE 18 sends at least six seconds worth of navigation bits for at least one SV, it will be certain that a full HOW can be found somewhere in the predicted message. This predicted HOW can be decoded. From the decoded HOW, the GPS receiver's clock can be set to a coarse GPS time.

Figure 5:
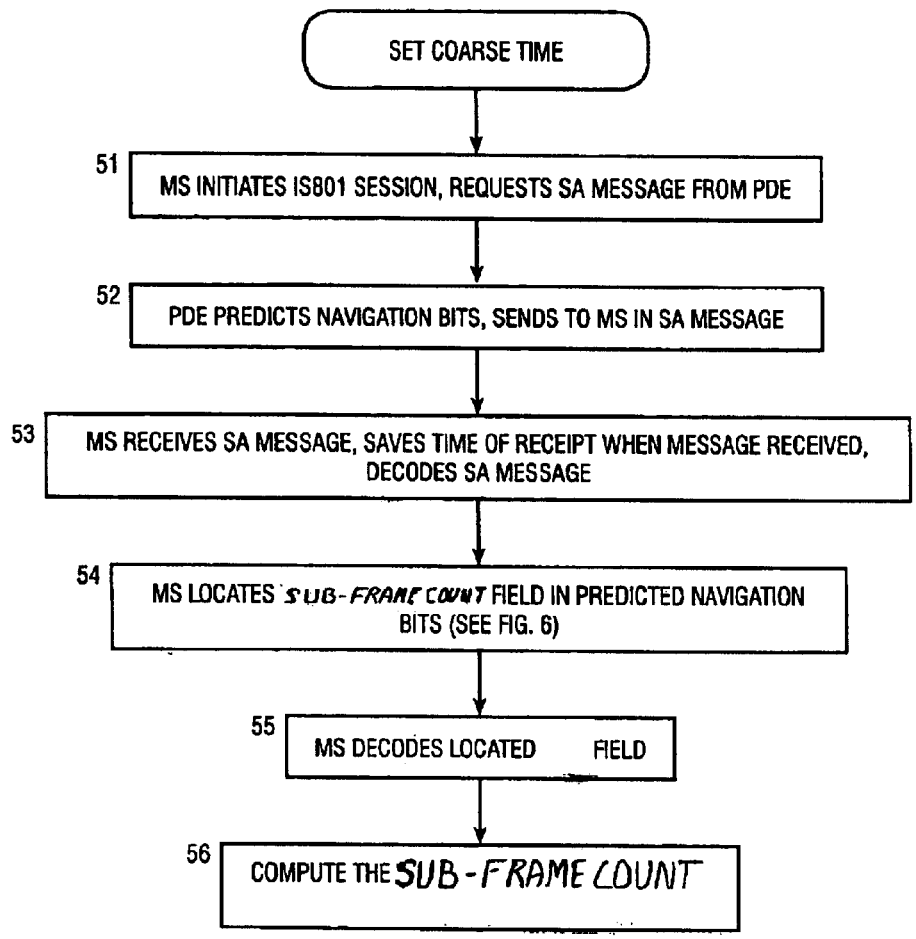
FIG. 5 is a flowchart of steps to set coarse time from using a SA message in asynchronous networks.
Figure 6:
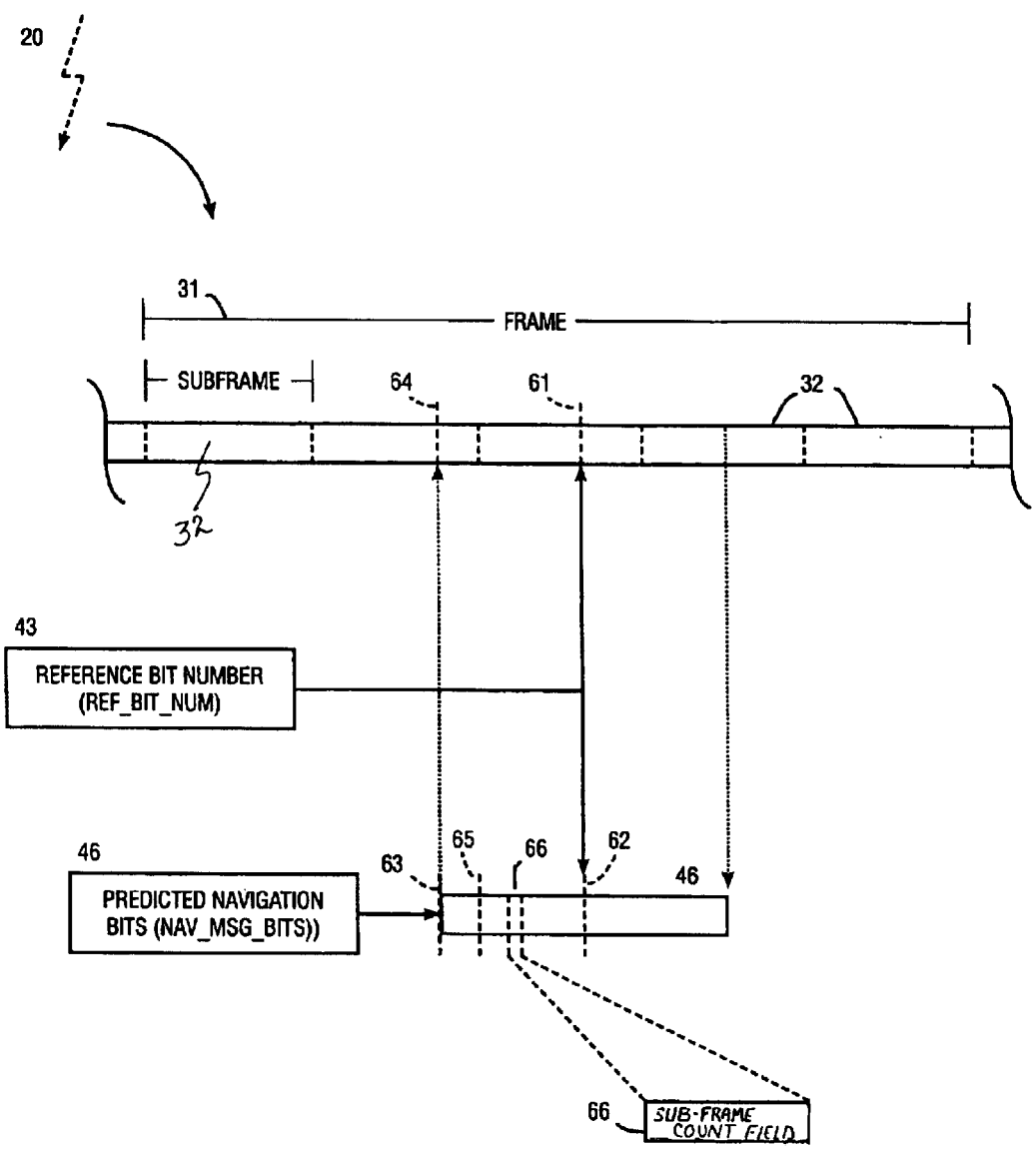
FIG. 6 is a bit mapping showing the correspondence between the predicted navigation bits, a frame of a GPS message, and the TOW field.

FIG. 5 is a flowchart of steps to set coarse time from the IS-801 type message in asynchronous networks. FIG. 6 shows the correspondence between the predicted navigation bits, a frame of a GPS message, and the SUB-FRAME COUNT field. In the following discussion, reference is made to the IS-801 standard for purposes of illustration. It should be apparent that the method could apply to other position determination systems. However, the disclosed method and apparatus is most useful in an asynchronous system in which an IS-801 message source is available. The MS 14 (FIG. 1) is in communication with the base stations, and receives a request, such as from a user, to determine the position of the MS.

At 51, an IS-801 type session is initiated (for example either an MO or MT IS-801 type session), and during the IS-801 type session (preferably at the beginning of the session), the MS requests an assistance message (SA data in IS-801 type format) from the PDE 18 (FIG. 1).

At 52, in response to the request from the MS, the PDE 18 predicts future navigation bits utilizing its GPS reference receiver 19, and forms the SA message shown in FIG. 4. When forming the SA message, the PDE 18 sets the Reference Bit Number field to indicate the position within the 1500 bit SV message frame (in the range from 0 to 1499) of the Actual Reference Bit that corresponds with the Predicted Reference Bit. The PDE 18 also sets a value for the Data Record Size field, which specifies the length of the Predicted Navigation Bits field. The PDE 18 arranges for transmission of the SA message from a BTS at a time that will cause the first bit of the Predicted Navigation Bits field of the SA message to be received by the MS at approximately the same time as the receiver in the MS would receive the corresponding bit of the actual navigation bits from the GPS SVs.

At 53, upon arrival of the SA data from the PDE 18, the receiver software notes the time indicated by the local clock when the first bit of the SA message was received. In an alternative method, the time at which some other particular part of the SA message, such as the Predicted Reference Bit of the predicted navigation bits, is received might be noted. The PDE 18 saves the indicated time. The receiver then decodes the SA message in order to determine the content of the message. It should be noted that while the first bit of the Predicated Navigation Bits field in the SA message is the reference point in time for synchronizing the predicted navigation bits with the actual navigation bits, any other well-defined reference within the stream of actual navigation bits could be used. However, the fact that the first bit of the Predicted Navigation Bits field in the SA message is easy to detect makes it a convenient choice. It should also be noted that the rate at which the stream of predicted navigation bits is received by the MS is typically far greater than the rate at which actual navigation bits are transmitted from the SVs. However, as long as the first bit of the Predicted Navigation Bits field of the SA message arrives at the MS at approximately the same time as the corresponding bit transmitted by the SVs (or at a known offset in time), the presently described method will be effective.

At 54, after decoding the SA message, the values of the Reference Bit Number field 43 (FIG. 4) and the Data Record Size 44 will be known to the MS. Using this information, the predicted SUB-FRAME COUNT field within the predicted navigation bits is located as discussed in greater detail below with reference to FIG. 6.

Reference is now made to FIG. 6 in conjunction with FIG. 5. As discussed above, the value of the Reference Bit Number field 43 conveys the position of the Actual Reference Bit 61, (shown in FIG. 6), within the 1500-bit GPS frame sent by the SVs. It should be clear that the location of the Actual Reference Bit shown in FIG. 6 is only one example of the location of the Actual Reference Bit. In actual practice the Actual Reference Bit may fall anywhere within the frame 31. The Actual Reference Bit 61 of the SV message corresponds with a bit 62 in the middle of the decoded predicted navigation bits (i.e., the Predicted Reference Bit 62). Since the value of the Reference Bit Number field 43 indicates the distance of the Actual Reference Bit 61 from the start of the frame 31 (i.e., a value from 0 to 1499, as noted above), the distance to the nearest preceding SUB-FRAME COUNT field 66 within the stream of predicted navigation bits can be easily calculated.

In accordance with one implementation, the Predicted Reference Bit 62 is always the last bit of the first half of the stream of predicted navigation bits in the SA message. Then, using the knowledge of the length of the Predicted Navigation Bits field, the receiver software can determine where the SUB-FRAME COUNT field 66 lies within the stream of predicted navigation bits. It should be noted that the location of the HOW that includes the SUB-FRAME COUNT field 66 always starts at location bit 30, 330, 630, 930, and 1230 referenced from the start of the frame. This is because the format of the SV navigation message is rigid. Therefore, if the Reference Bit Number field has a value of 1201 and the Data Record Size 44 has a value of 398, then the first bit of the SA Predicted Navigation Bits is the 1001, which is the location of the Actual Reference Bit, 1201 (as provided by the Reference Bit Number field 43) minus one half of the length of the data record (398/2) plus one=200.

Accordingly, since there are 300 bits in each of the five words of the 1500 bit frame, the first bit of the Predicted Navigation Bits field would correspond to the 101$^{st}$ bit of the fourth word. Clearly, the SUB-FRAME COUNT in the fourth word will not be included since the SUB-FRAME COUNT in the fourth word occurs in bits 31–60, but the SUB-FRAME COUNT of the fifth word that occurs 229 bits into the SA Predicted Navigation Bits field, would be provided.

Referring again to FIG. 5, at 55, the MS then decodes the located SUB-FRAME COUNT field 66. In the current implementation, decoding a word within the stream of predicted navigation bits requires that the D30 bit 35 of the preceding word be available (See FIG. 3). Therefore, in order to decode the HOW word 37, the D30 bit 35 of the preceding (TLM) word 36 must be available within the predicted navigation bits. Accordingly, the first decodable HOW word in the predicted navigation bits must be preceded by a D30 bit. In the example provided above in which the first bit of the Predicted Navigation Bits field is bit 1001, the D30 bit would occur 198 bits into the Predicted Navigation Bits field (1199–1001). Accordingly, the D30 bit preceding the SUB-FRAME COUNT in the fifth word would be available.

In one implementation the following substeps are performed to decode the SUB-FRAME COUNT:

1. Determine the position within the bit 64 of the SV navigation message frame that corresponds to the first bit of the Predicted Navigation Bits field 63 within its subframe (i.e. position 0–299). In the example provided above, that position is represented by the value 1001−900=101.

2. Determine the position of the beginning of the first decodable HOW word relative to the first bit of the Predicted Navigation Bits field 63 and save the 17-bit SUB-FRAME COUNT value. In the example provided above, that position is represented by the value 229. It should be noted that there could be more than one complete HOW word within the stream of predicted navigation bits. For example, if there are 496 predicted navigation bits, then two complete HOW words (and therefore two complete SUB-FRAME COUNT fields) may be available. For convenience of description it will be assumed that the first HOW word will be chosen for decoding. Alternatively, any other of the HOW words within the stream of predicted navigation bits could be decoded.

3. Determine the position of the D30 bit of the word directly preceding the HOW (the TLM word in this implementation) relative to the first bit of the Predicted Navigation Bits field and save this D30 bit value. In the example provided above, that position would be represented by the value 198. In one implementation, in the event that the D30 bit of the directly preceding word is not provided with the predicted navigation bits, then this SUB-FRAME COUNT Field cannot be decoded, and in that event the next SUB-FRAME COUNT Field would be chosen for decoding.

4. Decode the SUB-FRAME COUNT: invert the bits of the SUB-FRAME COUNT if the D30 bit has a binary value of "1" to obtain the decoded value of the SUB-FRAME COUNT from its OTA value. If the D30 bit has a binary value of "0", then the bits of the SUB-FRAME COUNT are ready for use.

At 56, the decoded SUB-FRAME COUNT value and the position of the SUB-FRAME COUNT Field within the predicted navigation bits are used to decode the SUB-FRAME COUNT value. It will be understood that the SUB-FRAME COUNT value refers to the beginning of the sub-frame immediately following the sub-frame that includes the decoded SUB-FRAME COUNT field 66 referenced from the beginning of the week. It may be noted that, in the IS-801 implementation, the length of the Predicted Navigation Bits field 46 is made long enough to include at least one SUB-FRAME COUNT value, and possibly two. As noted above, the SUB-FRAME COUNT value has a value in a range from 0 to 100,799 (100,800 possible values) that represents the number of subframes that have occurred since the start of the week. Furthermore, as discussed above, a subframe is transmitted every six seconds. Accordingly, the SUB-FRAME COUNT indicates the number of six-second intervals since the beginning of the week at midnight Saturday night—Sunday morning on the Universal Coordinated Time scale, which is nominally referenced to the Greenwich Meridian.

A process for determining the time indicated by the SUB-FRAME COUNT field 66 is now disclosed. It should be noted that the time indicated by the SUB-FRAME COUNT is the time at the start of the sub-frame following the sub-frame that includes the SUB-FRAME COUNT. Noting that there are 300 bits per sub-frame and each bit persists for 20 milliseconds, the time with respect to the beginning of the week is calculated (e.g. time=300*SUB-FRAME COUNT*20 ms). This calculated time indicates the number of milliseconds elapsed from the beginning of the current GPS week to the time the subframe associated with the SUB-FRAME COUNT was transmitted by the SV. For the purpose of setting the clock to a coarse time value, the difference between time of transmission and time of reception can be neglected. It should be noted that in the example provided above, the SUB-FRAME COUNT is from the fifth subframe. Accordingly, the time calculated from the SUB-FRAME COUNT is the time at which the next frame begins. That is, the time is 1501 minus 1001 bits after the first bit of the Predicted Navigation Bits field was received.

The time of the first bit within the Predicted Navigation Bits field of the SA message is determined. This process is described with reference to 54 and to FIG. 6. In the example provided above, the position of the first bit of the Predicted Navigation Bits field has a value of 1001 and the time is (300*SUB-FRAME COUNT*20 ms)−((1501−1001)*20 ms). Alternatively, the location of the first bit of the Predicted Navigation Bits field with respect to the first bit of the subframe to which the SUB-FRAME COUNT relates could be first subtracted. That is, the time at the first bit of the Predicted Navigation Bits field could be calculated as ((300*SUB-FRAME COUNT)−(1501−1001))*20 ms. In yet another alternative embodiment of the current method, the SUB-FRAME COUNT value can be adjusted to point to the beginning of the subframe that carries the SUB-FRAME COUNT.

After such an adjustment, position 1001 of the first bit of the Predicted Navigation Bits field would be subtracted from the position 1201 of the first bit of the subframe that carries the SUB-FRAME COUNT. The time at the beginning of the Predicted Navigation Bits field would then be calculated as (300*(SUB-FRAME COUNT−1))−(1201−1001)*20 ms.

It should be noted that the minimum length of the Predicated Navigation Bits field is 330 bits in order to ensure that the needed D30 bit is available. Furthermore, subtracting from the SUB-FRAME COUNT has to be taken modulo 100,800 to avoid negative values if the predicted navigation bits span the week rollover.

In another example using the IS-801 standards, assume the Predicted Navigation Bits field has a length of 500 bits, and the Reference Bit Number field has a value that designates a position in the GPS frame at bit 700. Then, since the Reference Bit Number corresponds to the last bit of the first half of the predicted navigation bits, the first bit of the Predicted Navigation Bits field is 700−500/2+1=451. So the first bit of the Predicted Navigation Bits field is the 451st bit of the frame transmitted by the SV. Each subframe has a 300-bit length, each word has a 30-bit length, and the HOW word is the second word in each subframe. Therefore, bit #451 is located in the second subframe, after the HOW word. In other examples, it is possible that the first bit of the Predicted Navigation Bits field reaches back to the previous GPS frame, so the calculation of the location of the first bit of the Predicted Navigation Bits field from the Reference Bit Number must be done using a modulo 1500 subtraction (i.e., 1−2=1499).

Referring again to the flowchart of FIG. 5, at 57, the error (uncertainty or "coarseness") in the coarse time is estimated. It should be recognized that the coarseness (i.e., the amount of uncertainty) in setting the GPS time can be approximately bounded. This is because the coarseness depends primarily on the transmission latency of the network within which the PDE 18 sends the SA message to the MS. The transmission latency in turn depends on the mode of transmission employed within the given network. Accordingly, the latency can be measured and/or predetermined. So, when the PDE 18 sends the SA message, the majority of any time inaccuracy can be attributed to the time it takes to send the bits from the PDE 18 to the receiver, which is termed the "network latency". In one example, the network latency may be in the range of several seconds, however, adjustments can be made to account for that latency.

Thus, this uncertainty typically takes into account network latency but may take into account other factors; alternatively, this error may be predetermined based upon expected network latency conditions. So, in the step 52, when the PDE 18 sends the SA message approximately synchronized with the actual timing of the navigation message sent by a GPS SV, then the majority of any time inaccuracy can be attributed to the time it takes to send the bits from the PDE 18 to the receiver, which is termed the "network latency", and may be in the range of several seconds.

At 58, the GPS receiver's clock 30 (FIG. 2) is set to the coarse time at the time of receipt of the beginning of the Predicted Navigation Bits field in the SA message. The clock's bias is set to zero, and the time uncertainty is set to the predetermined error value. As discussed above, the coarse time has an uncertainty in the accuracy, which primarily can be attributed to the network latency. In other words, the value to which the clock is set is accurate only within the limits of this uncertainty resulting from the network latency. Since accurate time is most often not known to a GPS receiver prior to fixing the location of the receiver, it is common practice to maintain time in the GPS clock software by its value and an uncertainty associated with that value. In this case the uncertainty of the coarse time may be in the range of several seconds.

At 59, the predicted navigation bits are passed to a method, such as a Pattern Match Algorithm, which then determines precise GPS time. In one embodiment, the predicted navigation bits are passed in unchanged, OTA format from the SA message to the Pattern Match algorithm, which is then performed to compute precise GPS time (which may be accurate to within a few milliseconds in a current implementation. A Pattern Match Algorithm is disclosed in U.S. Pat. Nos. 5,812,087, 6,052,081, and 6,377,209 to Norman F. Krasner.

At 60, the GPS clock is then set to the computed, precise GPS time. Then, with the GPS time known, the location is fixed using any appropriate procedures. It may be noted that after a location fix has been performed, the GPS time is known to an accuracy of a few nanoseconds. Therefore, after a location fix the GPS clock may be re-set with this highly accurate time.

Extension to Allow Determination of Week Number

The previous discussion addresses the problem of establishing the time within a week, which is required to reference certain Assistance data typically supplied by the server. However, this processing does not resolve the actual week number. The week number counts the number of GPS weeks that have occurred since the GPS clock was started. (The GPS clock was started at 00:00 AM on Jan. 6, 1980). Certain data types may have a fairly long life that extends beyond the current week; the SV Almanac being one example of this. Therefore occasionally a need arises to establish a time estimate that also resolves the week number ambiguity.

In the IS-801 standard, the week number is transmitted by all SV's in subframe 1 (Bits 1:10 of the $3^{rd}$ word in subframe 1). This information may be embedded in the SA prediction data supplied by the IS-801 server, and therefore a suitable bit extraction code can be used to isolate the week number field from the SA prediction data, and then be used to determine the week number.

It will be appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

What is claimed is:

1. A method for setting coarse GPS time in a GPS receiver comprising:

a) requesting a sequence of predicted navigation bits;

b) receiving the predicted navigation bits;

c) saving a time of receipt of the navigation bits;

d) locating a predicted time indicator field within the predicted navigation bits;

e) determining a coarse time setting in response to the located time indicator field; and f) setting coarse GPS time within the GPS receiver responsive to the difference between the coarse time setting and the time of receipt.

2. The method of claim 1 further comprising performing a Pattern Match Algorithm to provide precise GPS time.

3. The method of claim 1 further comprising:

a) determining an expected error in the coarse time setting; and b) setting coarse GPS time within the GPS receiver taking into account the expected error in a GPS clock.

4. The method of claim 1 wherein the predicted navigation bits are received in a format that includes a plurality of frames, each frame organized into a plurality of subframes, each subframe having the time indicator field and including at least one subframe of predicted navigation bits; the method further comprising:

locating the predicted time indicator field within at least one subframe of the predicted navigation bits; and calculating the coarse GPS time from the predicted time indicator.

5. The method of claim 1 wherein the predicted navigation bits field is transmitted with a data length that specifies the length of the sequence of predicted navigation bits, and a Reference Bit Number that designates the location of a predicted navigation bit within a frame of actual navigation bits, the method further comprising:

determining a location within a frame of actual navigation bits, of a first bit within the sequence of predicted navigation bits based on the value of the Reference Bit Number and the data length;

locating the time indicator field within the predicted navigation bits based on the value of the Reference Bit Number;

decoding the located time indicator field to provide a predicted time indicator, determining the coarse GPS with respect to the time at which the first bit of the sequence of predicted navigation bits was received; and coincident with the first bit of the sequence of predicted navigation bits, setting coarse GPS time within the GPS receiver.

6. The method of claim 1 wherein the MS and the base station are communicating using a GSM system.

7. A mobile station for determining position utilizing periodically transmitted navigation bits from a plurality of SVs synchronized with GPS time, the periodically transmitted navigation bits including a time indicator field, the mobile station also communicating with one or more base stations and a position determining entity (PDE) comprising:

a two-way communication system for communicating with the base stations and the PDE;

a position location system that includes a GPS clock;

means for requesting an assistance message from the PDE, the assistance message including a sequence of predicted navigation bits sent from the base station approximately synchronized in time with GPS time;

means for saving a time of receipt of the assistance message;

means for locating the predicted time indicator field within the predicted navigation bits;

means, responsive to the located time indicator field, for determining a predicted Time of Week; and means for setting coarse GPS time within the GPS receiver responsive to the predicted Time of Week and the time of receipt.

8. The mobile station of claim 7 further comprising means, responsive to the coarse GPS time and the predicted navigation bits, for performing a Pattern Match Algorithm to provide precise GPS time.

9. The mobile station of claim 7 further comprising:

means for determining an expected error in the Time of Week; and the means for setting coarse GPS time within the GPS receiver includes means for setting the expected error in a GPS clock.

10. The mobile station of claim 7 wherein the transmitted navigation bits have a format including a plurality of frames, each frame organized into a plurality of subframes, each subframe having a time indicator field, and the assistance message includes at least one subframe of predicted navigation bits, and further comprising:

means for locating a predicted time indicator field within a subframe of the predicted navigation bits; and means for calculating the Time of Week responsive to the predicted time indicator.

11. The mobile station of claim 10 wherein the assistance message includes a data length field that specifies the length of the predicted navigation bits, and a Reference Bit Number that designates a bit within a frame of the actual navigation bits, and further comprising:

means, responsive to the Reference Bit Number field and the length field, for determining a First bit of the sequence of predicted navigation bits that corresponds to the position of the first bit of the sequence within a frame of actual navigation bits;

means, responsive to the position of the first bit of the sequence of predicted navigation bits, for locating a time indicator field within the predicted navigation bits;

means, responsive to the predicted time indicator, for determining a Time of Week at the first bit of the sequence of predicted navigation bits; and means for setting coarse GPS time within the GPS receiver coincident with the first bit of the sequence of predicted navigation bits and responsive to the Time of Week.

12. A method for synchronizing a GPS receiver with coarse GPS time in a mobile station (MS) communicating with a base station and a position determining entity (PDE) using the IS-801 standard, the GPS receiver configured to receive periodically transmitted navigation bits from a plurality of SVs synchronized with GPS time, the transmitted navigation bits having a format including a plurality of frames, each frame organized into a plurality of subframes, each subframe having a SUB-FRAME COUNT message, comprising:

by the MS, requesting a Sensitivity Assistance (SA) message from the PDE, the SA message including a Predicted Navigation Bits field that includes a sequence of predicted navigation bits including at least one subframe, a Data Record Size field that specifies the length of the Predicted Navigation Bits field, and a Reference Bit Number field that designates a bit within a frame of the actual navigation bits, thereby associating the predicted navigation bits with a group of navigation bits;

responsive to the request from the MS, sending the SA message from the base station approximately in time with GPS time;

receiving the SA message in the MS, and saving a time of receipt of the SA message;

responsive to the Reference Bit Number field and the Data Record Size field, determining a first bit of the sequence of predicted navigation bits that corresponds to the position of the first bit of the sequence within a frame of actual navigation bits;

responsive to the position of the first bit of the sequence of predicted navigation bits, locating the SUB-FRAME COUNT field within the predicted navigation bits;

decoding the located SUB-FRAME COUNT field to provide a predicted SUB-FRAME COUNT value;

responsive to the predicted SUB-FRAME COUNT value, determining the Time of Week at the first bit of the sequence of predicted navigation bits; and coincident with the first bit of the sequence of predicted navigation bits, setting coarse GPS time within the GPS receiver responsive to the predicted SUB-FRAME COUNT and the time of receipt.

13. The method of claim 12 further comprising determining an expected error in the Time of Week; and the step of setting coarse GPS time further includes setting the expected error.

14. The method of claim 13 wherein the predicted SUB-FRAME COUNT value is defined with regard to a weekly time reference, and the step of determining the Time of Week comprises computing a Bit of Week corresponding to the number of bits elapsed from the weekly time reference until the first bit of the sequence of predicted navigation bits, responsive to the predicted SUB-FRAME COUNT value and the position of the first bit of the sequence of predicted navigation bits.

15. The method of claim 14 wherein the step of computing a Bit of Week comprises determining if the first bit of the sequence of predicted navigation bits is in the same sub-frame as the SUB-FRAME COUNT field, and responsive thereto, adjusting the predicted SUB-FRAME COUNT value.

16. The method of claim 12 further comprising, responsive to the coarse GPS time and the predicted navigation bits, performing a Pattern Match Algorithm to provide precise GPS time.

17. The method of claim 12 wherein the MS and the base station are communicating using a GSM system.

* * * * *